Sept. 12, 1950 T. KELLEY 2,521,795
COIL WINDING MACHINE
Filed Nov. 6, 1946 2 Sheets-Sheet 1

INVENTOR
THOMAS KELLEY
BY
ATTORNEY

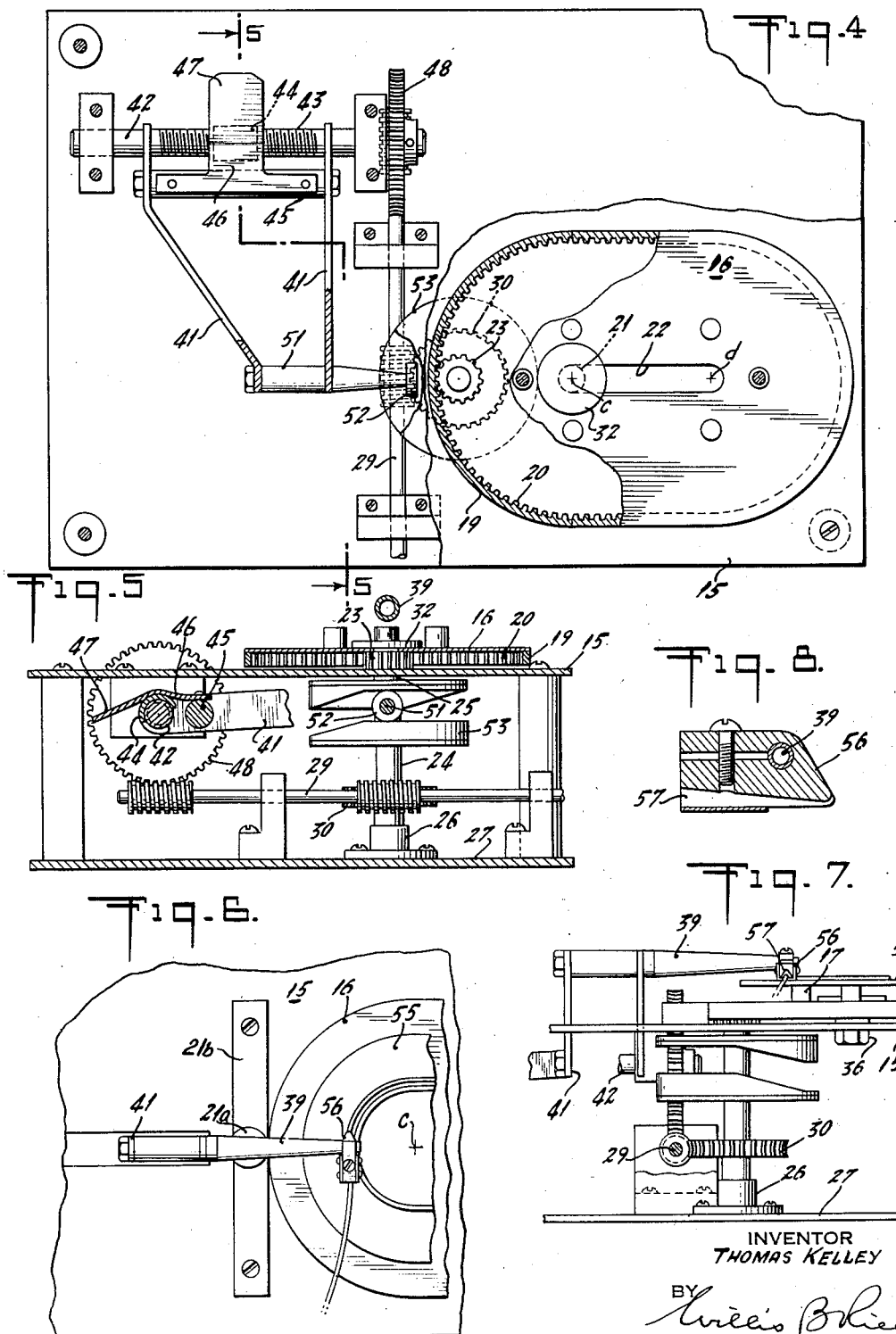

Patented Sept. 12, 1950

2,521,795

UNITED STATES PATENT OFFICE 2,521,795

COIL WINDING MACHINE

Thomas Kelley, New York, N. Y.

Application November 6, 1946, Serial No. 708,031

13 Claims. (Cl. 242—1)

This invention relates to a coil winding device for winding coils, the adjacent turns of which lie substantially in a plane to form a flat coil useful for many purposes such as for the antenna coil of the radio receiver. The device is particularly applicable when the coil is elongated to have greater width than height, commonly having circular ends and straight sides.

It is an object of this invention to provide a coil winding machine of the character described which will wind such a coil quickly and accurately so that successively made coils may have identical electrical characteristics and may be substitutable for each other in quantity production and for replacement purposes.

Such coils may have different specific forms. The simplest form would be to wind the coil into a narrow slot between flat plates. For most of the purposes for which such coils are used, however, the internal capacity of the coil is an important factor, which must be reduced to a minimum by spacing the adjacent turns of the coil. The present invention is primarily for the winding of such coils, in one of which the coil turns are spaced by winding the wire back and forth between the legs of a spider, and in the other, the turns are cemented to a flat surface in spaced relation.

It is an object of this invention to provide a machine upon which either type of coil may be wound.

These coils are frequently designed to fit within a rectangular space, and to get the best results within that space the coil itself is elongated, having a central straight portion and semicircular ends. The machine of this invention is particularly designed to have the capacity to wind such a coil, and yet to maintain a uniform spacing and tension in the turns throughout, so as to maintain standard characteristics of the coils, to reduce to a minimum the amount of individual adjustment to other apparatus when the coils are used in quantity production.

The invention accordingly comprises an article of manufacture possessing the features, properties and the relation of elements which will be exemplified in the article hereinafter described and the scope of the application of which will be indicated in the claims.

Figure 1:
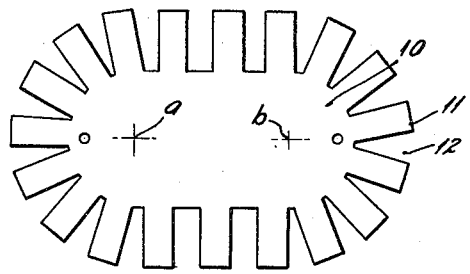
Figure 2:
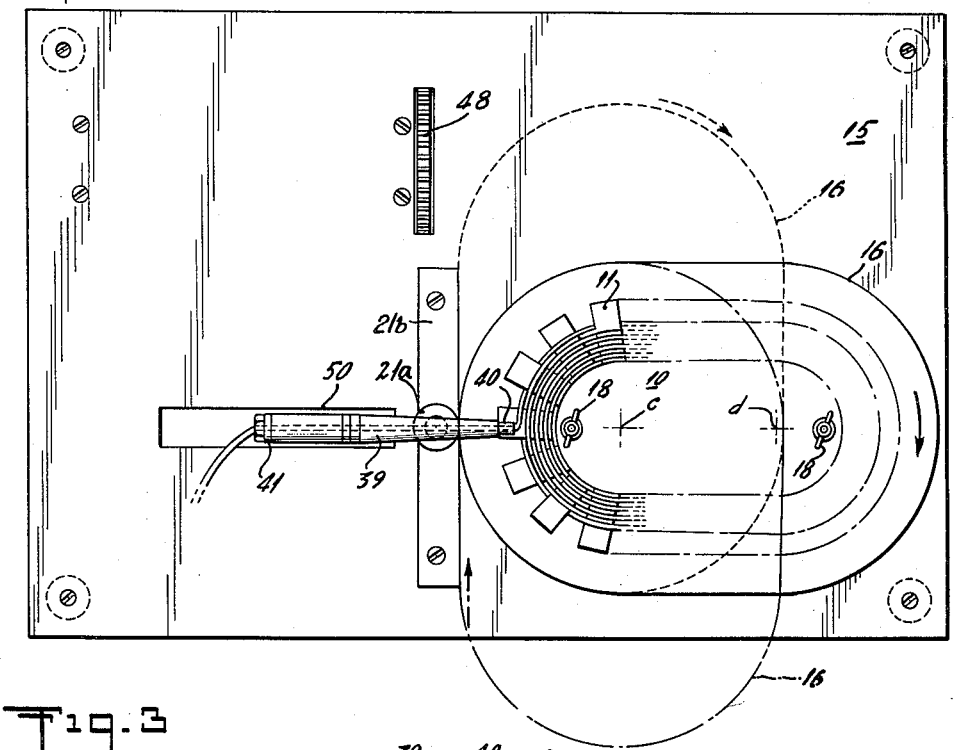
Figure 3:
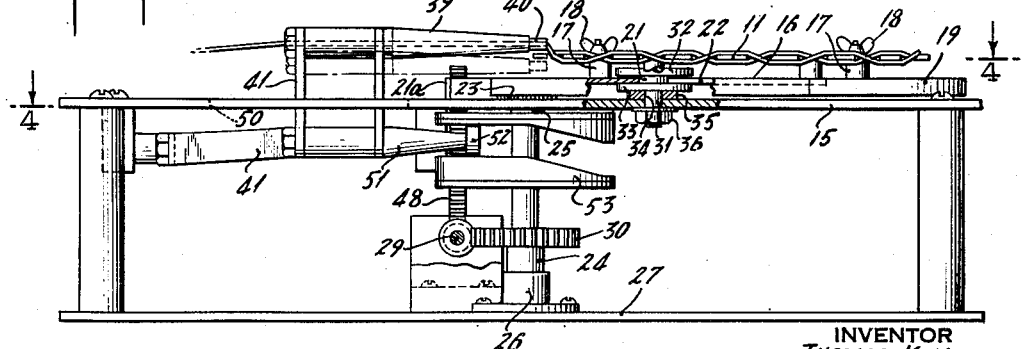

For a fuller understanding of the nature and objects of the invention, reference should be had to the following detailed description taken in connection with the accompanying drawings, in which:

Fig. 1 represents a type of spider on which a coil made in accordance with this invention may be wound. Fig. 2 is a top plan view of a machine for winding a coil on the spider of Fig. 1. Fig. 3 is a side elevation of the same. Fig. 4 is a section on the line 4—4 of Fig. 3, with part of the plate broken away, and Fig. 5 is a section on the line 5—5 of Fig. 4, with the flange of the plate broken away to show the drive pinion. Fig. 6 is a fragmentary top plan view similar to Fig. 2 showing a form of the machine when used to wind a coil having turns on one plane. Fig. 7 is a fragmentary side elevational view of Fig. 6 similar to Fig. 3 showing cam arm omitted. Fig. 8 is a section of the winding head shown in Figs. 6 and 7.

Referring now to Fig. 1, there is provided a spider on which the first form of coil is wound having a body portion 10, having a rectangular central portion and circular ends centered about points $a$ and $b$. Extending outwardly from the periphery of this spider is a plurality of teeth or fingers 11 separated by slots 12 which are equally spaced upon a central pitch-line. In order to place successive turns on opposite sides of each tooth, there is an uneven number of these teeth. Coils are now commonly wound upon such a spider by hand, by winding the wire over one tooth and under the next, over the next and under the next around the periphery until the required number of turns is obtained.

The winding of such coils by previous methods has, however, been cumbersome and expensive, and the coils themselves have been of variable electrical characteristics because of the differences in the distances between the turns, and other variations in the winding.

This machine comprises generally a table 15 upon which there is slidably mounted a plate 16, also having a rectangular center, and semicircular ends centered about points $c$ and $d$ of such shape that when the spider 10 is mounted upon it, points $a$ and $b$ will coincide with points $c$ and $d$ so that the periphery of the plate will be parallel to the periphery of the central portion 10 of the spider, and may coincide with the outer ends of teeth 11. Posts 17 extend upwardly from the plate 16 to support the spider 10, which latter is held in place upon the plate by wing nuts 18 screwed upon the ends of the posts. The plate 16 has a downwardly turned flange 19 around its entire periphery having gear teeth 20 cut in the inner face thereof.

The plate is moved over the table in a controlled motion by cooperation between an antifriction roller 21 and a pinion 23. This roller moves in a slot 22 in the plate which extends between the centers c and d. The pinion 23 meshes with the teeth 20 on the flange 19. This pinion is mounted on a vertical shaft 24 journalled in the table at 25 and in a boss 26 on the base 27 which supports the table. This shaft is driven from a horizontal drive shaft 29 by means of a worm and pinion 30.

The roller 21 is journalled on a pin 31 having a head 32 above the plate 16, and a stem extending downwardly through the slot, furnishing at that point a bearing for the roller 21. Below this bearing the pin has a shoulder 33 beyond which it is reduced in diameter as at 34 to extend downwardly through a spacing block 35 and table 15 to be secured by a nut 36. The shoulder is so spaced from the head as to permit a free rotation of the roller 21.

The ends of the slot 22 are semicircular, of a diameter equal to the diameter of the roller 21. By this construction, as will be clear, the rotation of the pinion 23 will rotate the plate 16 about the center c during the movement about the semicircular end of the spider, and then will slide it to move the roller through the length of the slot until the center d is reached, whereupon it will rotate about d to return through the slot to c for each turn.

A retaining friction roller 21a is mounted in position to bear upon the outside of the flange 19 opposite the pinion 23 to hold the pinion in engagement with the teeth 20, and a straight edged guide 21b is mounted in position to bear against the straight portion of the flange 19 as the plate 16 is turned.

Wire is led to the device through a head 39 having a tip 40 upon its end. This head is mounted for movement through the slots 12 from the upper side of the spider to the lower, and for movement progressively outward from the base of the teeth outwardly to the outer ends, as successive turns are wound.

To accomplish this movement, the head extends outwardly toward the spider from a supporting frame 41 having two rearwardly extending arms pivoted upon a horizontal shaft 42 to permit up and down movement by swinging about the shaft, and to permit movement from left to right by sliding upon the shaft.

The central portion of the shaft 42 is screwthreaded at 43, and a semicylindrical nut 44 is carried upon a brace 45 attached to the frame 41, in position to bear against and mesh with the screw 43. This nut 44 is carried upon a spring arm 46 having a handle 47, so that it may be lifted high enough to slide over the screw 43. The screw carrying shaft 42 is driven from the drive shaft 29 by a worm and pinion 48.

In this manner, if the drive shaft 29 is rotated, the head 39 and hence the tip 40 is moved outwardly away from the slot 22 a fixed amount for each revolution so that successive turns of wire are spaced from each other by a fixed amount. As here shown, the shaft 42 and screw 43 are situated below the table top 15 and the frame 41 extends upwardly through openings 50 in the table top to support the head 39.

The frame 41 also carries a forwardly projecting arm 51 below the table, having a roller 52 bearing upon a cam 53 upon the shaft 24. This arm may be made removable to permit winding of coils without a spider, this cam being of such a construction that it moves the head upwardly and downwardly alternately as each successive slot 12 is reached by the head. As shown, the cam 53 is of two parts, one above and one below, to engage the roller 52 positively for motion in both directions.

With the construction shown, it will be clear that as the shaft 29 is rotated, it will swing the plate 16 around to carry the wire in a curve parallel to the periphery of the body 10, and moreover, since the head 39 is moved up and down at each space 12, the wire will thus be wound over one arm of the spider and under the next, over the next, and so on, until the entire coil is completed. Moreover, since the head 39 is positively moved outward at a definite speed, and since the plate 16 is moved around at a definite fixed speed, it will be clear that the turns of the coil will be uniformly spaced and a uniform tension can be kept upon the coils making all coils with a similar setting of the machine, identical.

Figs. 6, 7, and 8 show the machine as equipped to wind a planar coil, that is a coil all of the turns of which lie in a plane. When used for this purpose, the arm 51 (as shown in Fig. 7) or the cams 53, or both, are removed, to avoid the up and down movement of the head. Instead of the spider 10, there is mounted upon the posts 17, an unslotted plate 55 carrying a sheet of paper or plastic, having an adhesive surface into which the wire may be pressed, and which is capable of retaining it in position.

There is mounted upon the end of the head 39 a tip 56 having a triangular opening 57 terminating in a semicircular groove having substantially the diameter of the wire to be fed, to form a nose to embed the wire as it is laid into the surface. This tip is put on the head 39 parallel to the direction of winding, with the nose inclined downwardly. The wire is led through the tip direct, in the direction of winding without passing through the head 39.

With the construction just outlined, and with the wire extending through the tip, the head and frame will be supported by contact between the wire and the adhesive sheet. Thus the wire will be embedded in the surface by the weight of the frame and head, and will be wound in turns parallel to the periphery, each turn being spaced from the preceding by the distance determined by the speed ratios of the pinions 30 and 48. Such a coil has less internal inductance than the spider wound coil, but for the same external size, it will have greater resistance.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

I claim:

1. A coil winding machine comprising in combination, a table, a plate upon said table having gear teeth around its periphery, having a pitch line parallel to the turns of wire to be wound upon the coil, said plate having a central opening, the edges of which are at all points uniformly spaced from said pitch line, a pinion journalled in said table, engaging said gear teeth to drive said plate, a guide roller mounted upon said table to engage the edge of said opening in alignment with said pinion to guide said plate, a head movable outwardly from said central opening having a channel through which a wire may be fed, and means to move said head outwardly as said plate is rotated by said pinion.

2. A device in accordance with claim 1 having means for supporting a spider upon said plate, said spider having radially extending teeth around its periphery, and means synchronized with the rotation of said plate for moving said head upwardly and downwardly between alternate pairs of teeth.

3. A device of the character described comprising a table, a pinion journalled to rotate above said table about a vertical axis, a plate above said pinion having a downwardly extending flange around its periphery, and gear teeth upon the inside edge of said flange for engaging said pinion, said plate having a central opening therein with its edges at every point equally spaced from the flange, an anti-friction roller journalled upon said table in position to engage said flange at a point opposite said pinion, a guide roller for engaging the edge of said opening in alignment with said anti-friction roller and pinion, a head for feeding wire to said plate, and means for moving said head radially outward from said central opening as said plate is rotated.

4. A device in accordance with claim 3 in which said plate is adapted to carry a form having an adhesive surface thereon, and said head is provided with a delivery tip for said wire adapted to cause said wire as it is fed to be embedded in said adhesive surface.

5. A device in accordance with claim 3 in which said central opening is in the form of a slot of the width of the guide roller and the periphery of said plate has parallel edges and semicircular ends, said slot extending between the centers of said ends.

6. A device in accordance with claim 3 having a bar upon said table transverse to the line connecting the center of said pinion with the axis of said guide roller, and substantially in alignment with the surface of the anti-friction roller to serve as a guide for the flat side of the plate.

7. A device in accordance with claim 3 in which the plate is adapted to support a spider having radially extending arms and in which there is provided means for moving said head upwardly and downwardly between each alternate pair of said arms, as said plate is rotated.

8. A device for winding a coil having straight sides and semicircular ends comprising a plate for supporting a coil form, means for moving said form parallel to the straight edges thereof without rotation, and for rotating said form about a fixed center at each end of said form, a head for moving a wire to a winding position of said form, and means for moving said head outwardly as said coil is wound at a uniform rate.

9. Means for winding a coil having parallel sides and semicircular ends comprising a plate for supporting said coil, means for driving said plate from its periphery, said plate having a periphery parallel to the turns of the coil to be wound, said plate having a slot extending between the centers of the semicircular ends, and parallel to the sides of the said coils, and a guide fitting within said slot, a head for guiding a wire to said form, means for moving said head regularly outwardly from said slot as the rotation progresses.

10. A device according to claim 9 having means to move said head up and down regularly as said plate is rotated.

11. A device according to claim 3 in which the plate is adapted to support a spider having radially extending arms, and having means for supporting said head comprising a pivoted frame, a foot extending outwardly from said frame, and a cam driven with said pinion shaped to move said head up and down.

12. A device according to claim 3 in which the head is slidingly pivoted upon a shaft having a screw thread thereon, and in which the head moving means comprises a half nut releasably engaging said screw thread.

13. A coil winding machine comprising in combination, a table adapted to carry a coil winding form having radially extending fingers, means to rotate said form in its own plane, an arm for feeding a wire to a point adjacent to the periphery of said form at the base of said fingers, means for moving said wire feeding means outwardly from said form as the latter is rotated, and means to move said arm vertically between said fingers as said form is rotated.

THOMAS KELLEY.

REFERENCES CITED

The following references are of record in the file of this patent:

UNITED STATES PATENTS

| Number | Name | Date |
|---|---|---|
| 1,413,367 | Treanor | Apr. 18, 1922 |
| 1,414,679 | Turney | May 22, 1922 |